United States Patent
Rein et al.

(10) Patent No.: US 8,893,017 B2
(45) Date of Patent: Nov. 18, 2014

(54) TRACKING CHANGES IN A DATABASE TOOL

(75) Inventors: Todd Rein, San Francisco, CA (US); Eylon Stroh, San Carlos, CA (US); Shashi Rai, Santa Clara, CA (US); Marco Qualizza, Ontario (CA); Roman Dolgov, San Carlos, CA (US); Chris Ethier, Ontario (CA); Robert Shaver, Watertown, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1122 days.

(21) Appl. No.: 12/129,635

(22) Filed: May 29, 2008

(65) Prior Publication Data

US 2014/0033101 A1    Jan. 30, 2014

(51) Int. Cl.
*G06F 3/00* (2006.01)
*G06F 17/30* (2006.01)

(52) U.S. Cl.
CPC .............................. *G06F 17/30575* (2013.01)
USPC ............ 715/751; 715/738; 715/770; 715/843

(58) Field of Classification Search
CPC ................................................ G06F 17/30575
USPC ................... 715/738, 751, 770, 843
See application file for complete search history.

(56) References Cited

U.S. PATENT DOCUMENTS

| | | | |
|---|---|---|---|
| 4,714,992 A | 12/1987 | Gladney et al. | |
| 4,949,300 A | 8/1990 | Christenson et al. | |
| 5,008,853 A | 4/1991 | Bly et al. | |
| 5,014,267 A | 5/1991 | Tompkins et al. | |
| 5,072,412 A | 12/1991 | Henderson, Jr. et al. | |
| 5,220,657 A | 6/1993 | Bly et al. | |
| 5,245,553 A | 9/1993 | Tanenbaum | |
| 5,247,615 A | 9/1993 | Mori et al. | |
| 5,293,619 A | 3/1994 | Dean | |
| 5,339,389 A | 8/1994 | Bates et al. | |
| 5,379,374 A | 1/1995 | Ishizaki et al. | |
| 5,388,196 A | 2/1995 | Pajak et al. | |
| 5,428,729 A | 6/1995 | Chang et al. | |
| 5,446,842 A | 8/1995 | Schaeffer et al. | |
| 5,471,318 A | 11/1995 | Ahuja et al. | |
| 5,515,491 A | 5/1996 | Bates et al. | |

(Continued)

OTHER PUBLICATIONS

Word, Microsoft Office Word 2003, Copyright 1983-2003 Microsoft Corporation, Fig. 1-10.*
"Adobe to Acquire Virtual Ubiquity", The Buzzword Blog Building the first real word processor for the web, [Online] Retrieved from the internet: <URL:http://blog.buzzword.com/vu/index.php?paged=2>, (Oct. 1, 2007), 10 pgs.

(Continued)

*Primary Examiner* — Andrey Belousov
(74) *Attorney, Agent, or Firm* — Shook, Hardy & Bacon L.L.P.

(57) ABSTRACT

In one example embodiment, a system and method is illustrated that includes receiving input to execute a function associated with a display element of a Graphical User Interface (GUI), the display element to display edit history data relating to a displayed portion of structured data. The system and method also includes retrieving the edit history data for the displayed portion of the structured data based upon the function, the edit history data reflecting changes made to the displayed portion of the structured data. The system and method also includes displaying the edit history data in the GUI as part of the display element.

30 Claims, 19 Drawing Sheets

(56) References Cited

U.S. PATENT DOCUMENTS

| | | | |
|---|---|---|---|
| 5,608,872 | A | 3/1997 | Schwartz et al. |
| 5,617,539 | A | 4/1997 | Ludwig et al. |
| 5,664,183 | A | 9/1997 | Cirulli et al. |
| 5,671,428 | A | 9/1997 | Muranaga et al. |
| 5,729,730 | A | 3/1998 | Wlaschin et al. |
| 5,758,079 | A | 5/1998 | Ludwig et al. |
| 5,778,368 | A | 7/1998 | Hogan et al. |
| 5,787,175 | A | 7/1998 | Carter |
| 5,835,601 | A | 11/1998 | Shimbo et al. |
| 5,867,654 | A | 2/1999 | Ludwig et al. |
| 5,907,324 | A | 5/1999 | Larson et al. |
| 5,920,694 | A | 7/1999 | Carleton et al. |
| 5,963,208 | A | 10/1999 | Dolan et al. |
| 5,966,512 | A | 10/1999 | Bates et al. |
| 5,978,817 | A | 11/1999 | Giannandrea et al. |
| 5,995,097 | A | 11/1999 | Tokumine et al. |
| 6,005,568 | A | 12/1999 | Simonoff et al. |
| 6,005,571 | A | 12/1999 | Pachauri |
| 6,088,702 | A | 7/2000 | Plantz et al. |
| 6,151,604 | A | 11/2000 | Wlaschin et al. |
| 6,163,775 | A | 12/2000 | Wlaschin et al. |
| 6,182,121 | B1 | 1/2001 | Wlaschin |
| 6,314,408 | B1 | 11/2001 | Salas et al. |
| 6,314,425 | B1 | 11/2001 | Serbinis et al. |
| 6,342,906 | B1 | 1/2002 | Kumar et al. |
| 6,366,933 | B1 | 4/2002 | Ball et al. |
| 6,442,748 | B1 | 8/2002 | Bowman-Amuah et al. |
| 6,446,093 | B2 | 9/2002 | Tabuchi |
| 6,502,113 | B1 | 12/2002 | Crawford et al. |
| 6,507,845 | B1 | 1/2003 | Cohen et al. |
| 6,584,466 | B1 | 6/2003 | Serbinis et al. |
| 6,632,251 | B1 | 10/2003 | Rutten et al. |
| 6,643,663 | B1 | 11/2003 | Dabney et al. |
| 6,701,345 | B1 | 3/2004 | Carley et al. |
| 6,721,921 | B1 | 4/2004 | Altman |
| 6,757,871 | B1 | 6/2004 | Sato et al. |
| 6,772,393 | B1 | 8/2004 | Estrada et al. |
| 6,816,906 | B1 | 11/2004 | Icken et al. |
| 6,819,806 | B1 | 11/2004 | Kubota et al. |
| 6,839,878 | B1 | 1/2005 | Icken et al. |
| 6,865,548 | B2 | 3/2005 | Wiechers |
| 6,874,124 | B2 | 3/2005 | Murase et al. |
| 6,889,896 | B2 | 5/2005 | Silverbrook et al. |
| 6,894,804 | B2 | 5/2005 | Nguyen et al. |
| 6,898,601 | B2 | 5/2005 | Amado et al. |
| 6,901,376 | B1 | 5/2005 | Sculler et al. |
| 6,918,082 | B1 | 7/2005 | Gross et al. |
| 6,934,721 | B2 | 8/2005 | Schein |
| 6,950,828 | B2 | 9/2005 | Shaw et al. |
| 6,991,154 | B2 | 1/2006 | Silverbrook et al. |
| 7,007,232 | B1 | 2/2006 | Ross et al. |
| 7,044,363 | B2 | 5/2006 | Silverbrook et al. |
| 7,051,031 | B2 | 5/2006 | Schein |
| 7,146,367 | B2 | 12/2006 | Shutt |
| 7,249,314 | B2 | 7/2007 | Walker et al. |
| 7,263,655 | B1 | 8/2007 | Carden, Jr. |
| 2004/0088313 | A1* | 5/2004 | Torres ............... 707/101 |
| 2006/0026502 | A1 | 2/2006 | Dutta |
| 2008/0059539 | A1 | 3/2008 | Chin et al. |
| 2008/0282180 | A1* | 11/2008 | Glasgow et al. ........ 715/770 |

OTHER PUBLICATIONS

"Comparison of office suites", *Comparison of office suites—Wikipedia, the free encylopedia*, [Online] Retrieved from the internet: <URL:http://en.wikipedia.org/wiki/List_of_office_suites>, (Mar. 16, 2008), 4 pgs.

"Forthcoming Functionality", The Buzzword Blog Building the first real word processor for the web, [Online] Retrieved from the internet: <URL:http://blog.buzzword.com/vu/index.php?paged=3>, (Jul. 15, 2007), 10 pgs.

"Google Docs", *Google Docs—Wikipedia, the free encyclopedia*, [Online]. Retrieved from the internet: <URL:http://en.wikipedia.org/wiki/Google_Docs>, (Mar. 16, 2008), 3 pages.

"List of word processors", From Wikipedia, the free encyclopedia the following is a list of word processors, [Online] Retrieved from the internet: <URL:http://en.wikipedia.org/wiki/List_of_word_processors>, (Mar. 16, 2008), 4 pgs.

"The Buzzword Blog Building the first real word processor for web", Buzzword vs Google docs, [Online] Retrieved from the internet: <URL:http://blog.virtub.com/>, (Mar. 12, 2008), 13 pages.

"ThinkFree Docs :: Search, Share & Publish documents Page", [Online] Retrieved from the internet: <URL:http://www.thinkfreedocs.com/, (Mar. 16, 2008), 1 page.

"ThinkFree Docs::Search, Share & Publish documents", [Online]. Retrieved from the internet: <URL:http://www.thinkfreedocs.com/about/faq.html>, FAQ, (Mar. 16, 2008), 1 page.

"ThinkFree Office by Haansoft Corporation", From Wikipedia, the free encyclopedia (Redirected from ThinkFree), [Online] Retrieved from the internet: <URL:http://en.wikipedia.org/wiki/ThinkFree>, (Nov. 7, 2006), 3 pgs.

"Working with Collaborators: Real time collaboration", [Online]. Retrieved from the internet: <URL:http://documents.google.com/support/bin/answer.py?answer=40971&topic=8628>, Google Docs Help Center, (Mar. 16, 2008), 2 pages.

"Working with Collaborators: Simultaneous editing and viewing", [Online]. Retrieved from the internet: <URL:http://documents.google.com/support/bin/answer.py?answer=44680&topic=8628>, Google Docs Help Center, (Mar. 16, 2008), 2 pages.

"ZCubes", *From Wikipedia, the free encyclopedia*, [Online] Retrieved from the internet: <URL:http://en.wikipedia.org/wiki/ZCubes>, (Sep. 30, 2007), 5 pages.

"Zoho Office Suite", From Wikipedia, the free encyclopedia (Redirected from Zoho Writer) Developed by AdventNet Inc. <URL:http://www.zoho.com>, [Online] Retrieved from the interent: <URL:http://en.wikipedia.org/wiki/Zoho_Writer>, (Mar. 16, 2008), 5 pgs.

Descy, Don E, "Browser-Based Online Applications: Something for Everyone!", *TechTrends: Linking Research and Practice to Improve Learning*, 51(2), (Mar. 2007), 3-5.

Shen, H., "Integrating Advanced Collaborative Capabilities into Web-Based Word Processors", *Lecture Notes in Computer Science*, 4674, (2007), 1-8.

Simsarian, Kristian, et al., "Shared Spatial Desktop Development", *Kungl Tekniska Hogskolan Royal Institute of Technology Numerical Analysis and Computing Science. CID-86, KTH*, Stockholm Sweden 1999, Report No. CID-86 ISSN No. ISSN 1403-073X Reports can be ordered from: URL: http://www.nada.kth.se/cid/, (Aug. 1999), 103 pages.

* cited by examiner

FIG. 2

| Person | Cell Phone # | IM | Mon | Tue | Wed | Thur | Fri |
|---|---|---|---|---|---|---|---|
| Kyle Brown | | | | | | | |
| Jimbo James | | | | | | | |
| Matt Yeiks | | | | | | | |
| Adrene Ritkoff | | | | | | | |
| Amanda Smith | 612-895-2895 | Asmith@ie.corp.mime.com | SJ | SJ | SJ | SJ | SJ |
| Brent Boomshire | | | | | | | |
| Logan James | | | | | | | |
| Jana Doe | | | | | | | |
| ~~Jan Seymore~~ | ~~952-951-3568~~ | ~~JaSeymore@extreme.com~~ | ~~SF~~ | ~~SF~~ | ~~SFO~~ | ~~SJ~~ | ~~Home~~ |
| Veronica Xi | 952-922-4422 | Vxi@booya.edu | SF | SF | Home | SF | SF |

ACME Finder   List   Edit   Insert   Help

Format [Text ▽]

History ○ ● ⊙ ⊙ ⊙
Today 11:17 Am – Dawn Rain

New   Meet

OK
Cancel

Share 107
201
202

FIG. 3

| Person | Cell Phone # | IM | Mon | Tue | Wed | Thur | Fri |
|---|---|---|---|---|---|---|---|
| Kyle Brown | | | | | | | |
| Jimbo James | | | | | | | |
| Matt Yeiks | | | | | | | |
| Adrene Ritkoff | | | | | | | |
| Amanda Smith | 612-895-2895 | Asmith@ie.corp.mime.com | SJ | SJ | SJ | SJ | SJ |
| Brent Boomshire | | | | | | | |
| Logan James | | | | | | | |
| Jana Doe | | | | | | | |
| ~~Jan Seymore~~ | ~~952-951-3568~~ | ~~JaSeymore@extreme.com~~ | ~~SF~~ | ~~SF~~ | ~~SFO~~ | ~~SJ~~ | ~~Home~~ |
| Veronica Xi | 952-922-4422 | Vxi@booya.edu | SF | SF | Home | SF | SF |

Deleted by J. Doe on April 1st 2008

FIG. 4

ACME Finder    List    Edit    Insert    Help

Format [Text ▽]                                    New              Meet

| Person | Cell Phone # | IM | Mon | Tue | Wed | Thur | Fri |
|---|---|---|---|---|---|---|---|
| Kyle Brown | | | | | | | |
| Jimbo James | | | | | | | |
| Matt Yeiks | | | | | | | |
| Adrene Ritkoff | | | | | | | |
| Amanda Smith | 612-895-2895 | Asmith@ie.corp.mime.com | SJ | SJ | SJ | SJ | SJ |
| Brent Boomshire | | | | | | | |
| Logan James | | | ~~SF~~ | ~~SF~~ | ~~SFO~~ | ~~SJ~~ | ~~Home~~ |
| Jana Doe | | | | | | | |
| ~~Jan Seymore~~ | ~~952-951-3568~~ | ~~JaSeymore@extreme.com~~ | | | | | |
| Veronica Xi | 952-922-4422 | Vxi@booya.edu | SF | SF | Home | SF | SF |

IM: updated by A. Smith to "SFO" on April 1st 2008
Mon: updated by A. Smith to "SJ" on April 2nd 2008

402

401

History  ○ ● ○ ○
Today 11:17 Am – Dawn Rain

Share                                              OK
                                                   Cancel

ACME Finder  List  Edit  Insert  Help

Format [Text ▽]

| Person | Cell Phone # | IM | Mon | Tue | Wed | Thur | Fri |
|---|---|---|---|---|---|---|---|
| Kyle Brown | | | | | | | |
| Jimbo James | | | | | | | |
| Matt Yeiks | | | | | | | |
| Adrene Ritkoff | | | | | | | |
| Amanda Smith | 612-895-2895 | Asmith@ie.corp.mime.com | SJ | SJ | SJ | SJ | SJ |
| Brent Boomshire | | | | | | | |
| Logan James | | | ~~SF~~ | ~~SF~~ | ~~SFO~~ | ~~SJ~~ | ~~Home~~ |
| Jana Doe | | ~~JaSeymore@extreme.com~~ | | | | | |
| ~~Jan Seymore~~ | ~~952-951-3568~~ | | | | | | |
| Veronica Xi | 952-922-4422 | Vxi@booya.edu | SF | SF | Home | SF | SF |

501: AmandaS@mor.comp.org updated April 3rd 2008
Smith15895@booya.edu updated April 6th 2008
SmittyKidd05@coldmail.com updated April 12th 2008

502

History ○ ● ○ ○
Today 11:17 Am – Dawn Rain

New    Meet

Share    OK    Cancel

| Person | Cell Phone # | IM | Mon | Tue | Wed | Thur | Fri |
|---|---|---|---|---|---|---|---|
| Kyle Brown | | | | | | | |
| Jimbo James | | | | | | | |
| Matt Yeiks | | | | | | | |
| Adrene Ritkoff | | | | | | | |
| Amanda Smith | 612-895-2895 | Asmith@ie.corp.mime.com | SJ | SJ | SJ | SJ | SJ |
| Brent Boomshire | | AmandaS@mor.comp.org updated by J. Doe, April 3rd 2008 | | | | | |
| Logan James | | Smith15895@booya.edu updated by J. Doe, April 6th 2008 | | | | | |
| Jana Doe | | SmittyKidd05@coldmail.com updated by J. Doe, April 12th 2008 | | | | | |
| Jan Seymore | 952-951-3568 | | SF | SF | SFO | SJ | Home |
| Veronica Xi | 952-922-4422 | | SF | SF | Home | SF | SF |

ACME Finder   List   Edit   Insert   Help

Format [Text ▽]                 New          Meet

History ○ ● ○ ○ ○
Today 11:17 Am – Dawn Rain

Share                                       OK
                                            Cancel 601, 602, 107

FIG. 7

ACME Finder   List   Edit   Insert   Help

Format [Text ▽]                                      New        Meet

| Links | Person | Cell Phone # | IM | Mon | Tue | Wed | Thur | Fri |
|---|---|---|---|---|---|---|---|---|
| Mgr. | Kyle Brown | | | | | | | |
| Dept. | Jimbo James | | | | | | | |
| Mgr. | Matt Yeiks | | | | | | | |
| Mgr. | Adrene Ritkoff | | | | | | | |
| Mgr. | Amanda Smith | 612-895-2895 | Asmith@ie.corp.mime.com | SJ | SJ | SJ | SJ | SJ |
| Dept. | Brent Boomshire | | AmandaS@mor.comp.org Added April 3rd 2008 — 702 | | | | | |
| Dept. | Logan James | | | | | | | |
| Dept. | Jana Doe | | | | | | | |
| Mgr. | ~~Jan Seymore~~ | ~~952-951-3568~~ | ~~JaSeymore@extreme.com~~ | ~~SF~~ | ~~SF~~ | ~~SFO~~ | ~~SJ~~ | ~~Home~~ |
| Dept. | Veronica Xi | 952-922-4422 | Vxi@booya.edu | SF | SF | Home | SF | SF |

701

History  ○ ● ○ ○ ○
Today 11:17 Am – Dawn Rain

Share                                               OK
                                                    Cancel

ACME Finder   List   Edit   Insert   Help           New   Meet

Format [Text ▼]                                                              107

| Person | Cell Phone # | IM | Mon | Tue | Wed | Thur | Fri | IM Handle |
|---|---|---|---|---|---|---|---|---|
| Kyle Brown | | | | | | | | BBear |
| Jimbo James | | | | | | | | JJ |
| Matt Yeiks | | | | | | | 801 | Yikes! |
| Adrene Ritkoff | | | | | | | | Rickyluv |
| Amanda Smith | 612-895-2895 | Asmith@ie.corp.mime.com | SJ | SJ | SJ | SJ | SJ | SmittyA |
| Brent Boomshire | | | | | | | | BoomShaka |
| Logan James | ~~952-951-3568~~ | ~~JaSeymore@extreme.com~~ | ~~SF~~ | ~~SF~~ | ~~SFO~~ | ~~SJ~~ | ~~Home~~ | LogJam |
| Jana Doe | | | | | | | | JDo |
| ~~Jan Seymore~~ | | | | | Home | | Home | SeyThis |
| Veronica Xi | 952-922-4422 | Vxi@booya.edu | SF | SF | SF | SF | SF | VikiX |

History  ○ ● ○ ○
Today 11:17 Am – Dawn Rain

Share                                              OK
                                                   Cancel

FIG. 9

| Person | Cell Phone # | IM | Mon | Tue | Wed | Thur | Fri |
|---|---|---|---|---|---|---|---|
| Kyle Brown | | | | | | | |
| Jimbo James | | | | | | | |
| Matt Yeiks | | | | | | | |
| Adrene Ritkoff | | | | | | | |
| Amanda Smith | 612-895-2895 | Asmith@ie.corp.mime.com | SJ | SJ | SJ | SJ | SJ |
| Brent Boomshire | | | | | | | |
| Logan James | | | | | | | |
| Jana Doe | | | | | | | |
| ~~Jan Seymore~~ | ~~952-951-3568~~ | JaSeymore@extreme.com | ~~SF~~ | ~~SF~~ | ~~SFO~~ | ~~SJ~~ | ~~Home~~ |
| Veronica Xi | ~~952-922-4922~~ | Vxi@booya.edu — 901 | SF | SF | Home | SF | SF |
| Matthew Chu | 608-865-8452 | | SF | SF | SF | SF | SF |

AmandaS@mor.comp.org Added April 3rd 2008 — 902

ACME Finder   List   Edit   Insert   Help
Format [Text ▽]
New   Meet
History  ○ ● ○ ○
Today 11:17 Am – Dawn Rain
Share
OK   Cancel

107

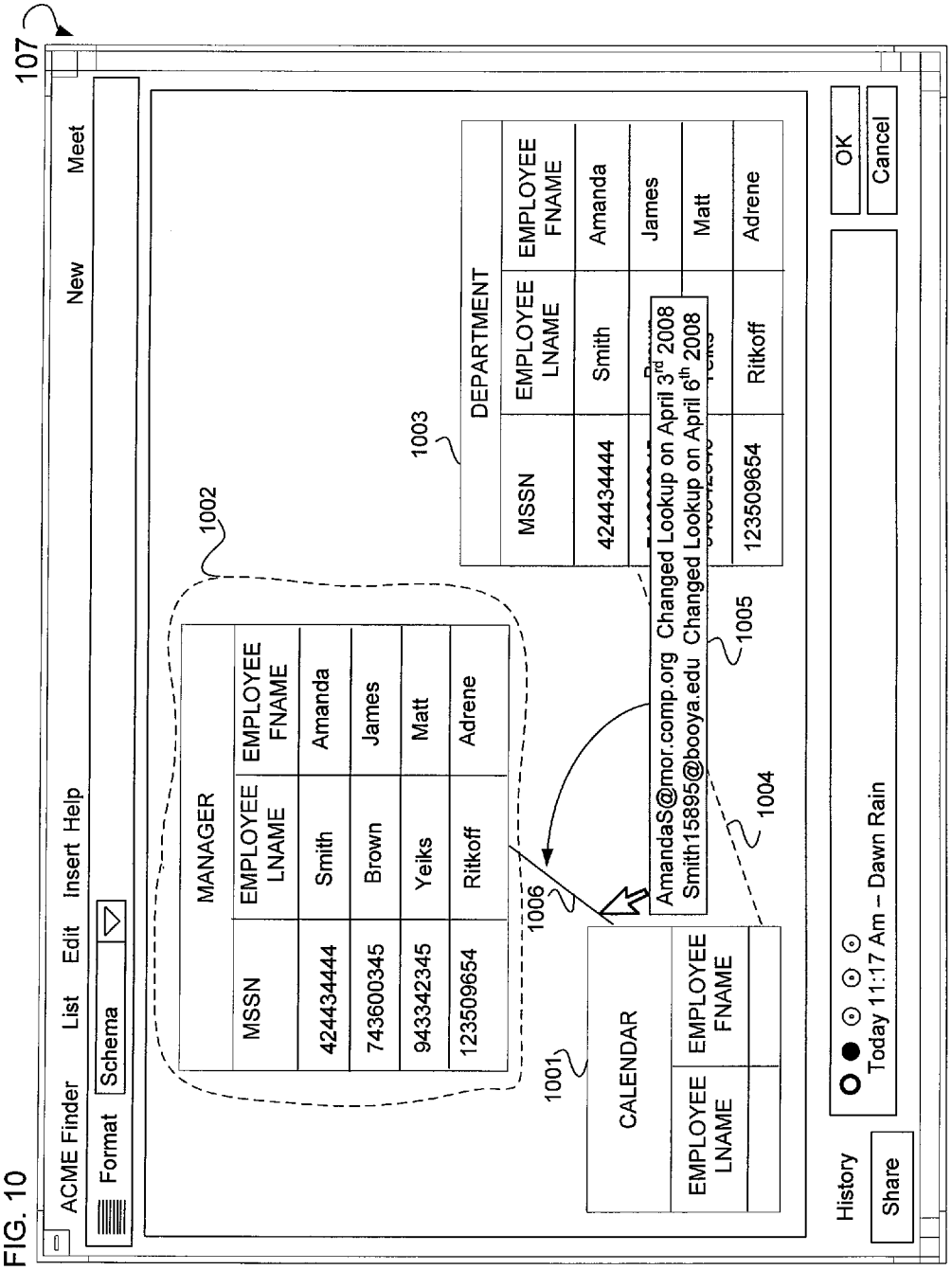

FIG. 11

ACME Finder    List    Edit    Insert    Help            New        Meet

Format [Text ▽]

| SALES AMOUNT | STATE | TAX RATE | AMOUNT OWED |
|---|---|---|---|
| $423555.34 | OREGON | 11% | $46591.08 |
| $453555.34 | CALIFORNIA | 33% | $149673.23 |
| $11155.34 | OHIO | 24% | $2677.28 |
| $523555.23 | | | $183244.33 |
| $527555.23 | | | $100235.49 |
| $823555.23 | RHODE ISLAND | 16% | $131768.83 |
| $521555.11 | WASHINGTON | 12% | $62586.61 |
| $923555.23 | MICHIGAN | 20% | $184711.04 |
| $523355.07 | MARYLAND | 22% | $115138.11 |
| $525555.19 | MINNESOTA | 45% | $236499.83 |
| $923555.23 | NORTH DAKOTA | 12% | $110826.62 |

AmandaS@mor.comp.org Changed Tax Rate Formula to: {(E − 3000)*0.0475 + 90} on April 3rd 2008
Smith15895@booya.edu Changed Tax Rate Formula to: {(tax rate * after tax sales amount) / (1 + tax rate)} on April 6th 2008

1101
1102
107

History
Share

Today 11:17 Am – Dawn Rain

OK
Cancel

TRACKING CHANGES IN A DATABASE TOOL

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright © 2008, Adobe Systems Incorporated. All Rights Reserved.

TECHNICAL FIELD

The present application relates generally to the technical field of algorithms and programming and, in one specific example, the display of data in a database.

BACKGROUND

Structured data resources (e.g., databases and spreadsheets) are widely used to store, manage and process data that is susceptible to such structure and organization. A database, as an example of structured data, may be used by many individuals (e.g., knowledge workers) who are not database administrators. These knowledge workers may make changes to the database in terms of changing the data in a table of the database or changing the arrangement of a schema associated with various database tables. Over time, these changes may be made by a number of individuals. Further, many of these changes may be collaborative in nature.

BRIEF DESCRIPTION OF THE DRAWINGS

Some embodiments are illustrated by way of example and not limitation in the figures of the accompanying drawings in which:

FIG. 2 is a diagram of a table displaying and editing Graphical User Interface (GUI), according to an example embodiment, illustrating an edited row.

FIG. 3 is a table display and editing GUI, according to an example embodiment, illustrating edit data displayed by a mouse pointer and tooltip for a table row.

FIG. 4 is a table display and editing GUI, according to an example embodiment, displaying an edit history with a plurality of entries.

FIG. 5 is a table display and editing GUI, according to an example embodiment, illustrating an edit history for a table row, where the user making the edit is identified by an email address.

FIG. 6 is a table display and editing GUI, according to an example embodiment, illustrating a dropdown menu used to show an edit history.

FIG. 7 is a table display and editing GUI, according to an example embodiment, showing the addition of a column including relations to other tables.

FIG. 8 is a table display and editing GUI, according to an example embodiment, used to display an added column.

FIG. 9 is a table display and editing GUI, according to an example embodiment, showing the addition of a row.

FIG. 10 is a table display and editing GUI, according to an example embodiment, illustrating a database schema and changes made to this database schema.

FIG. 11 is a table display and editing GUI, according to an example embodiment, illustrating a mouse pointer and associated tooltip including changed formulas.

DETAILED DESCRIPTION

Figure 1:
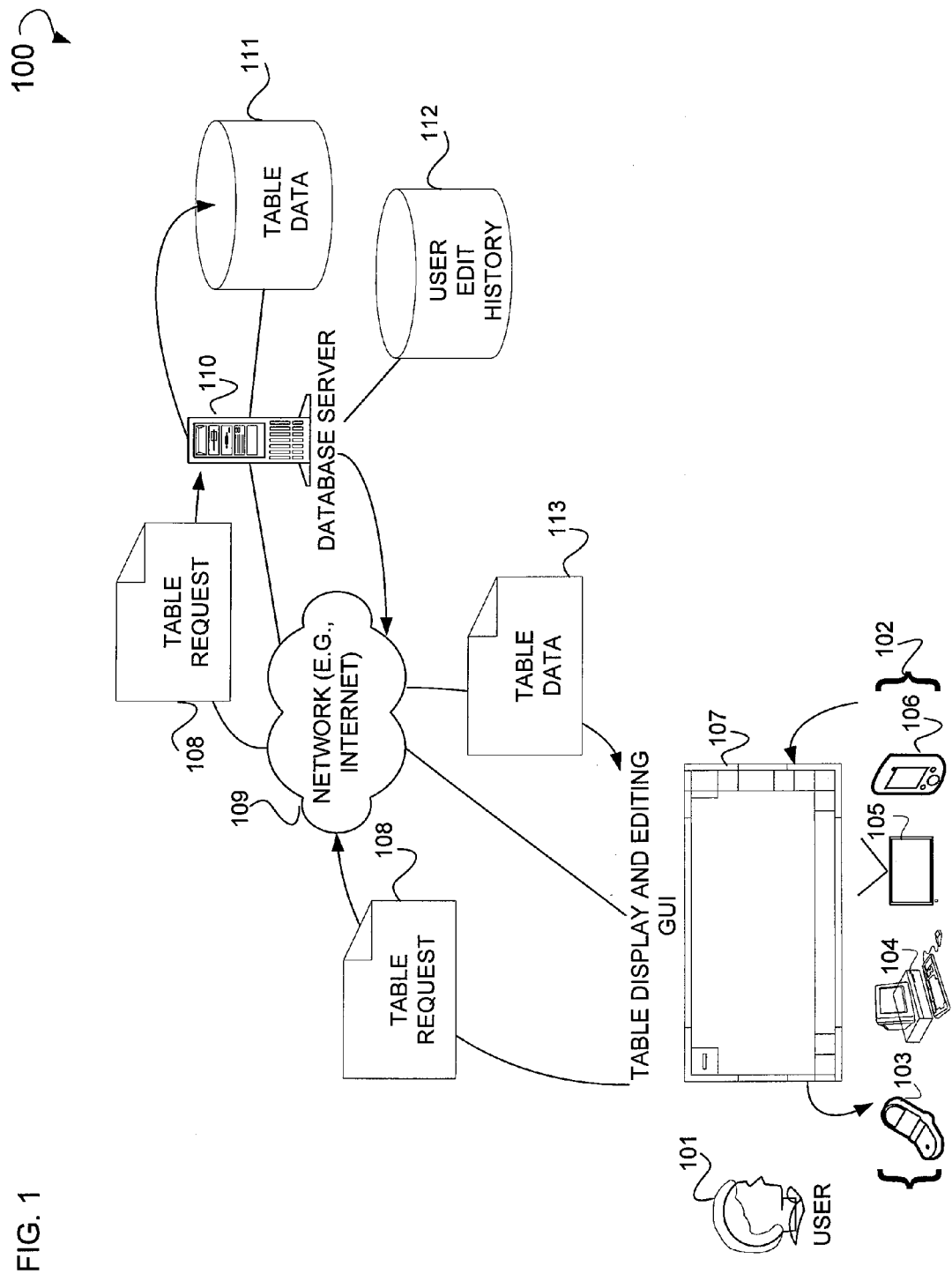
FIG. 1 is a diagram of a system, according to an example embodiment, used to make a table request and to retrieve table data.

In the following description, for purposes of explanation, numerous specific details are set forth to provide a thorough understanding of an example embodiment. It may be evident, however, to one skilled in the art that the present invention will be practiced without these specific details.

In some example embodiments, a system and method is illustrated for tracking changes or edits to a structured data resource (e.g., a table, schema, or document). A table may be visually represented as a grid, and may be referred to herein as a list. Example changes or edits may include the editing of record data, the changing of data (e.g., the addition or deletion of a record) within a row or column, the editing of a data style (e.g., the use of bold, italics, strike though) for a row or column, the adding or deletion of rows or columns, the changing of data types, the editing of relationships between tables in a schema, the editing of functions (e.g., mathematical formula, expressions, or equations) used to process the data included in a table or tables, the creation of new tables, the editing of privileges associated editing a table or schema, or some other suitable change. These edits may be made by one or more users acting collaboratively to edit a table. Edits or changes may be reflected in edit data. Associated with the edit data may be identity information identifying the user making an edit and the time and date of the edit. This edit data may be displayed later as an edit history (e.g., edit history data) associated with a particular database table or schema. This edit history may reflect edits over time. In some example cases, the table may be thought of as a list.

In some example embodiments, edit data may be recorded on a session basis and ultimately stored into a log file. This log file may be a text file (e.g., .txt formatted file) including Unicode or American Standard Code for Information Interchange (ASCII) based characters. Further, this log file may be stored into persistent or non-persistent memory. This log file may be retrieved as an edit history. A session may include a Transmission Control Protocol/Internet Protocol (TCP/IP) based session, a user activity based session, a temporal based session, or some other suitable basis for a session. User activity may include for example the user using some type of input device (e.g., a mouse, light pen, keyboard or other suitable input device) to interact with one or more devices and via a GUI. This input device may act as a selection device. The edit data may be recorded into the log file may record for a particular session. The log file may then be stored into a user edit history database.

In some example embodiments, a screen object or widget may be used to display this edit history. A display element (e.g., a screen object or widget) may be an element of a GUI that displays an information arrangement changeable by the user. A screen object or widget may include a graphical pointer, tooltip, a drop down menu, or other suitable screen object or widget. The screen objects or widget may be implemented via a browser-based client engine such as is used with FLASH™, Asynchronous JavaScript and XML (AJAX), ACTIVE X™, or Java. Additionally, screen objects or widgets may be components as may appear on a Visual Basic (VB) form, a C# form, or via a Java or C/C++ implementation. In one example embodiment, a graphical pointer (e.g., a mouse pointer) may be used in combination with another screen object or widget to display the edit history. For example, an edit history may be displayed where an input command is provided to execute a function associated with the mouse pointer and/or screen object or widget. This function may be a mouse-over function, a focus function, right-click function, left-click function, keyboard function, or other suitable. A focus function (e.g., focus) may be a function that facilitates an indication that a GUI screen object or widget is currently selected to receive input. In some example embodiments, focus includes a function that may be implemented which utilizes a Focus Follows Mouse (e.g., FFM) policy, where the focus automatically follows the current placement of the mouse pointer.

In some example embodiments, the input command may be provided with respect to a portion of a table or schema so as to retrieve and display the edit history with respect to that portion. For example, an edit history may be displayed via the screen object or widget with respect to a particular table, row, column, or schema. This edit history may be displayed via the screen object or widget being proximate to the particular table, row, column, function or schema. Proximate may include a measure of pixels between the screen object or widget and the particular table, row, column, or schema as displayed with a GUI. This measure may be within, for example, 0-100 pixels. Further, a screen object or widget may be used to turn off or on the display of the edit history, of the tracking of the edit history. Other suitable information, in addition to identifying information, may be displayed in the edit history.

In some example embodiments, the system and method shown herein may be implemented in real time. For example, in cases where an edit occurs to a table or schema this change may be reflected in real time and may be visible to a plurality of users. Further, through the use of, for example, Application Programming Interfaces (API) such as Open Database Connectivity (ODBC) the system and method illustrated herein may be platform independent such that it may be implemented with a plurality of database products (see database products outlined below).

Example System

FIG. 1 is a diagram of an example system 100 used to make a table request and to retrieve table data. This table data may include for example edit data that may reflect edits made to the table data over time or to, for example, a schema associated with the table over time. Illustrated is a user 101, who uses one or more devices 102 to generate a table request 108. This user 101 may be a knowledge worker. These one or more devices 102 may include a cell phone 103, a computer system 104, a television monitor 105, a Personal Digital Assistant (PDA) 106 or a smart phone (not shown). Each of these one or more devices 102 may have a display to show a GUI. Residing as a part of these one or more devices 102 is a table display and editing GUI 107. This table display and editing GUI 107 may be part of a browser application or a stand-alone application. A browser may be some type of Hyper Text Markup Language (HTML), or eXtensible Markup Language (XML) capable interpreter. A stand-alone application may be an application written using a VB form, C# form, or written using Java, or C/C++. In one example embodiment, the user 101 using the table display and editing GUI 107 in conjunction with the one or more devices 102 generates a table request 108. This table request 108 may be transmitted using a Hypertext Transfer Protocol (HTTP) or a Secure Hypertext Transfer Protocol (HTTPS). This table request 108 includes data uniquely identifying a particular table that the user 101 would like to view or edit. Further, this table request 108 may include data uniquely identifying a schema (e.g., a database schema) that the user 101 would like to view or edit. In some example embodiments, the table data request 108 may be some type of encoded Structured Query Language (SQL) based request that may be sent over HTTPS or HTTP. This table request 108 may be transmitted across a network 109 to be received by for example a database server 110.

In some example embodiments, operatively connected to this database server 110 is a table data database 111 and/or a user edit history database 112. Operatively connected may mean a logical or physical connection between the database server 110 and the table data database 111 and/or the user edit history database 112. These databases (e.g., 111 and 112) may reside natively as a part of the database server 110 or be managed by some type of intermediate device residing between the database server 110 and the databases (e.g., 111 and 112). This intermediate device may be a further database server or application server. The database server 110 retrieves table data 113 from the table data database 111. This table data 113 is transmitted across the network 109 to be received and displayed by the one or more devices 102. This table data 113 may include the previously illustrated edit data expressed as an edit history. The table data 113 may be transmitted using HTTPS or HTTP.

In some example embodiments, where the user 101 makes an edit to the table data, this edit may be reflected in real-time (or near real-time) in the table data displayed to other users. For the purposes of present application, "real-time" refers to the capability to respond to, communicate, process or display data in response to an event within an extant interaction session. In some example embodiments, an edit is transmitted asynchronously across the network 109 and received by the database 110. This edit may be transmitted using generated using AJAX in combination with HTTP. Once the edit is received, it may be stored into the user edit history database 112. It may then be transmitted to additional users as an edit update. This edit update may be transmitted using HTTP over a Transmission Control Protocol/Internet Protocol (TCP/IP) session connection with a device such as the one or more devices 102. A User Datagram Protocol/IP (UDP/IP) may be used in lieu of TCP/IP. The edit update may then be displayed in a table display and editing GUI similar to the table display and editing GUI 107.

Example Interfaces

FIG. 2 is a user interface diagram of an example table displaying and editing GUI 107 illustrating an edited row. Shown is a table row 201 illustrating deletions made by a user such as user 101. Further shown is a field 202 illustrating a version history for the table displayed within the table display and editing GUI 107. This versioning history may allow the user 101 to view various versions of a particular table, document or a structured data (e.g., database) schema. These versions may be based on some type of pre-determined time and/or date or other suitable basis to display a version of a table, document or database schema. Additionally, these version may be accessed via executing a radio button or some other suitable screen object or widget. Deletions, represented as a strike through displayed within table row 201, may be facilitated through the use as some type of input device. Further, these deletions may be further facilitated by generating various edit commands generated by the previously referenced input device. These edit commands may then be converted to edit data and stored as a log history for the user 101.

FIG. 3 is a user interface diagram showing an example table display and editing GUI 107 illustrating edit data displayed by a mouse pointer and tooltip 301. In some example embodiments, an area of a display table is focused upon using a mouse pointer. As a result of this area receiving a focus, a tool tip such as tool tip 301 is generated. For example, the tooltip 301 has an associated function that is selectively executed to present a display element (e.g., a tooltip) for the table row 201. When the mouse pointer is placed proximate to the table row 201, the tooltip 301 may display identifying information relating to the user who made the deletion associated with table row 201. This identifying information may include the user's ID and the date on which the deletion was made. Some other type of screen object or widget may be used in lieu of the mouse pointer and tooltip 301 to display the identifying information.

FIG. 4 is an example table display and editing GUI 107 displaying an edit history with a plurality of entries. Shown is a mouse pointer and tooltip 402 wherein a function associated with the tooltip 402 is executed. This function generates a tooltip for the table row 401. This tooltip includes an edit history for table row 401. Shown, for example, is a user ID, a data description relating to previous changes (e.g., edits), and the date on which certain changes were made to the table row 401. Some other suitable type of screen object or widget may be used in lieu of the mouse pointer and the tooltip 402 to illustrate the edit history for the table row 401. In some example embodiments, a location value for the table row 401 may displayed within the tooltip 402 to identify the exact field of a row being edited. Here, for example, the location value "IM" is used to denote a change to the field of the row associated with the IM column, and a location value of "Mon" is used to denote a change to the field of the row associated with the Mon column. This location value may also appear for columns being edited or other structured data being edited.

FIG. 5 is a user interface diagrams illustrating an example table display and editing GUI 107 illustrating an edit history for a table row, where the user making the edit is identified by an email address. Shown is a table row 502. Further, illustrated is a tooltip 501 wherein a function associated with the tooltip 501 is executed. This function generates a tooltip for the table row 502. This tooltip may include an edit history including an email address associated with the user making an edit, the previous edits, the type of edit and other identifying information. The type of identifying information shown in the tooltip may be configured based upon a user's needs. As illustrated elsewhere, some type of screen object or widget in lieu of a mouse pointer and tooltip 501.

FIG. 6 is a user interface diagram illustrating an example table display and editing GUI 107 and a drop-down menu 601 used to show an edit history. Shown is a field 602. Further, illustrated is a mouse pointer that is used to place the focus on the field 602. The drop-down menu 601 is generated as a result of this focus. Included within this drop-down menu may be: an identifier for the user 101, the data edited, and the date on which the edit occurred. As illustrated elsewhere, some other suitable type of screen object or widget may be used in lieu of the drop-down menu to convey the edit history associated with the field 602.

FIG. 7 is a user interface diagram illustrating an example table display and editing GUI 107 showing the addition of a column 701 including relations to other tables. This column 701 illustrates possible relations between a table and other tables within a structured data schema. These relations have been referenced herein as links or look-ups. A link or lookup may be a database operation such as a join operation, Cartesian Product operation, or some other suitable database operation. Further, link or lookup may be a pointer, or a hyperlink as defined in a markup language such as HTML. Through executing one of these links, the user 101 may be able to retrieve data from other tables that are linked to the table or may be able to display entirely new tables. Further, illustrated is the execution of functionality associated with a tooltip 702. This functionality generates the tooltip 702 for the added column 701. This tooltip 702 may include an edit history including an e-mail address associated with the user making an edit, the type of edit, the previous edits, and other identifying information. The type of identifying information shown in the tooltip may be configured based upon a user's needs. As illustrated elsewhere, some type of screen object or widget in lieu of the mouse pointer and the tooltip 702.

FIG. 8 is an example table display and editing GUI 107 used to display an added column 801. In some example embodiments, the user 101 may be able to add the column 801 into a table. Further, the column 801 may be visually distinguished or highlighted through the use of bolding, or some other type of highlighting, to denote that the user 101 added the column 801 to the table.

FIG. 9 is an example table display and editing GUI 107 showing the addition of a row. In some example embodiments, the user 101 may be able to add a row 901 to a table. This addition of the row 901 may be denoted through the use of some type of highlighting (e.g., such as bolding) or visual distinguishing. Further, illustrated is a tooltip 902 wherein a function associated with the tooltip 902 is executed. This function generates the tooltip 902 for the added row 901. This tooltip may include an edit history including an e-mail address associated with the user making an edit, the previous edits, the type of edit, and other identifying information. The type of identifying information shown in the tooltip may be configured based upon a user's needs. As illustrated elsewhere, some type of screen object or widget in lieu of the mouse pointer and the tooltip 902. In some example embodiments, the adding or deletion of a column or a row may be considered a schema change. For example, the added column 801 or added row 901 may result in schema change. The concept of schema change is more fully discussed below.

FIG. 10 is an example table display and editing GUI 107 illustrating structured data in the example form of a database schema, and changes made to this database schema. Changes to database schema may include the addition of a new table associated with the schema or the changing of relationships between tables within the schema. Shown is a table 1001, a table 1002, and a table 1003. The table 1002 may be added to a schema and, where added, a relationship may be created between for example the table 1001 and the table 1002. The relationship 1004 between the table 1001 and 1003 may be redirected to create a relationship between the table 1001 and the table 1002. Further, illustrated is a mouse pointer and tooltip 1005 wherein a function invoked by the mouse pointer and the tooltip 1005 is executed. This function generates a tooltip for the edit history for the changed relationship (e.g., the change from relationship 1004 to 1006). The tooltip may include an edit history including an e-mail address associated with the user making an edit, the previous edits, the type of edit, and identifying information. The type of identifying information shown in the tooltip may be configured based upon a user's needs. As illustrated elsewhere, some type of screen object or widget in lieu of a mouse pointer and tooltip 1005.

FIG. 11 is a user interface diagram illustrating an example table display and editing GUI 107 including a mouse pointer and a tooltip 1101. The tooltip 1101 reflects changes or edits relating to functions in a table row 1102 for of mathematical formulas, equations, or expressions. Further, illustrated is a mouse pointer and tooltip 1101 wherein a function associated with the tooltip 1101 is executed. This function generates a tooltip for the edit history for the changed mathematical formula used to process the data included within the table row 1102. The tooltip may include an edit history including an e-mail address associated with the user making an edit, the previous edits, the type of edit, the history of formulas being used for the table row 1102, and identifying information. The type of identifying information shown in the tooltip may be configured based upon a user's needs. As illustrated elsewhere, some type of screen object or widget in lieu of a mouse pointer and tooltip 1101.

Example Logic

Figure 12:
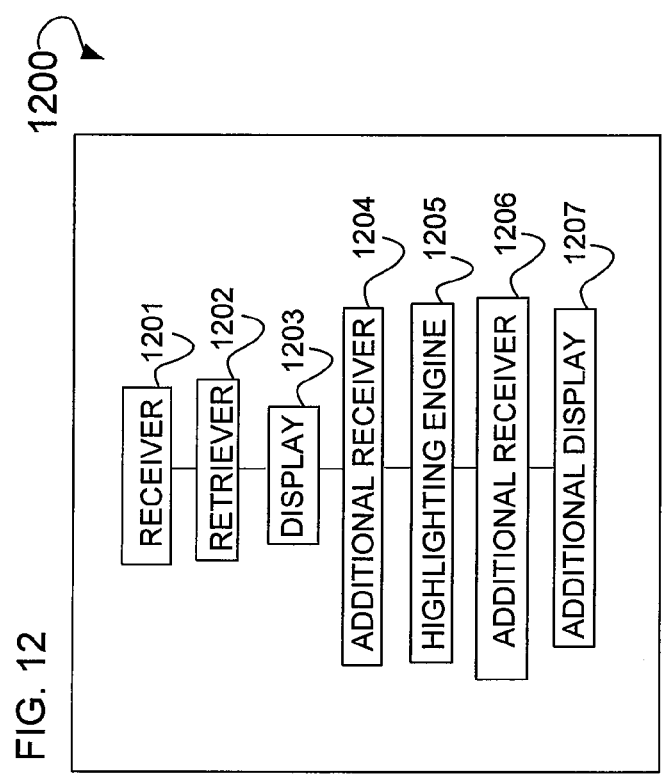
FIG. 12 is a block diagram of a computer system, according to an example embodiment, that may be used to display edit history data.

FIG. 12 is a block diagram of an example computer system 1200 that may be used to display edit history data. The blocks shown herein may be implemented in software, firmware, or hardware. These blocks may be communicatively coupled via a logical or physical connection. The computer system may be the one or more devices 102 or database server 110. Shown are blocks 1201 through 1207. Illustrated is a receiver 1201 to receive input to execute a function associated with a display element of a GUI, the display element to display edit history data relating to a displayed portion of structured data. Communicatively coupled to this receiver 1201 is a retriever 1202 to retrieve the edit history data for the displayed portion of the structured data based upon the function, the edit history data reflecting changes made to the displayed portion of the structured data. Further, communicatively coupled to this retriever 1202 is a display 1203 to display the edit history data in the GUI as part of the display element. In some example embodiments, the display element includes at least one of a graphical pointer, a tooltip, or a drop-down menu. Additionally, in some example embodiments, the function associated with the display element includes a mouse-over function, a focus function, right-click function, left-click function, or a keyboard function. Communicatively coupled to the display 1203 is an additional receiver 1204 to receive input to execute the function associated with the display element, the display element located proximate to the displayed portion of the structured data. Some example embodiments may include changes that include at least one of editing record data, deletion of a column, deletion of a row, a change to a data style, adding a row, adding a column, changing a data type, changing a relationship between tables in a schema, changing a function used to process data included in a database table, creating a new table, or changing privileges associated with editing the structured data. In some example embodiments, the displayed portion of the structured data includes at least one of a database table, a structured data column, a structured data row, or a structured data schema. Communicatively coupled to the additional receiver 1204 is a highlighting engine 1205 to highlight the displayed portion of the structured data. In some example embodiments, the edit history data includes identity information that identifies at least one of a user, date information, or time information.

In some example embodiments, the computer system 1200 includes an additional receiver 1206 to receive additional input to display the display element, the display element to display additional edit history data relating to an additional displayed portion of the structured data. This additional receiver 1206 is communicatively coupled to the highlighting engine 1205. Communicatively coupled to the highlighting engine 1206 is an additional retriever to retrieve additional edit history data for the additionally displayed portion of the structured data based on the function, the additional edit history data including additional changes made to the additionally displayed portion of the structured data. Further, communicatively coupled to the highlighting engine 1206 is an additional display 1207 to display the additional edit history data in real time on the display as part of the display element.

Figure 13:
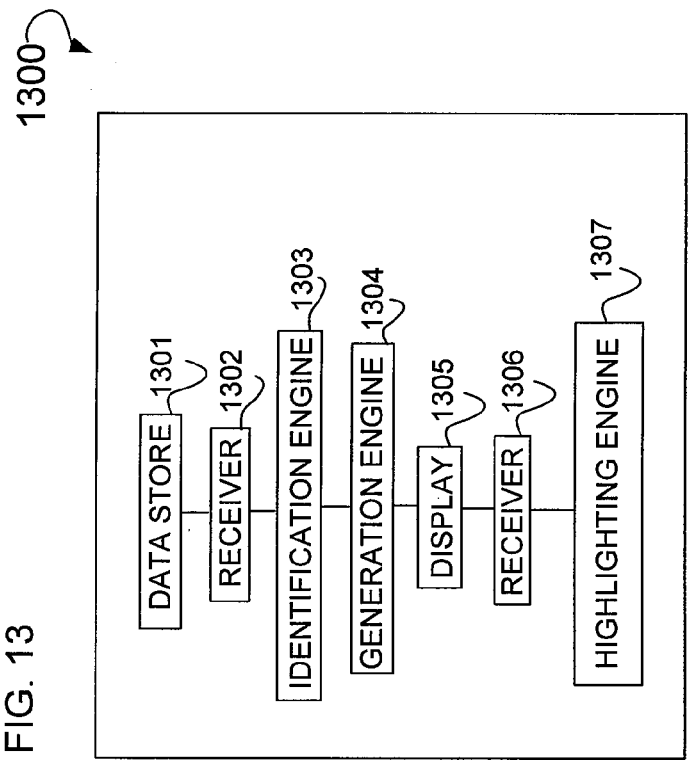
FIG. 13 is a block diagram of a computer system, according to an example embodiment, that may be used to display version data.

FIG. 13 is a block diagram of an example computer system 1300 that may be used to display edit history data. The blocks shown herein may be implemented in software, firmware, or hardware. The blocks may be communicatively coupled via a logical or physical connection. The computer system may be the one or more devices 102 or database server 110. Shown are blocks 1301 through 1306. Illustrated is a data store 1301 to store a plurality of versions of structured data. These versions may be organized serially by date, user session or some other suitable basis. Communicatively coupled to the data store 1301 is a receiver 1302 to receive identification for a first version selected by a user from the plurality of versions of the structured data, the first version being different from a current version of the structured data. A current version may be a version that is the most recently edited version, most recent temporally or some other suitable basis for determining a currently version. Communicatively coupled to the receiver 1302 is an identification engine 1303 identifying a change between the first version and the current version of the structured data. Communicatively coupled to the identification engine 1303 is a generation engine 1304 for generating a display of a change indicator to identify the change between the first version and the current version of the structured data, the change indicator being specific to a structure element of the structured data. A changing indicator may be a boolean value denoting that the structured data has been modified relative to a previous version of the structured data.

In some example embodiments, the computer system 1300 includes the generation engine 1304 communicatively coupled to a display 1305 to display version information to the user identifying the plurality of versions of the structured data, and receiving of the identification of the first version based on the display version information. In some example embodiments, identification includes user input to select the first version. The version information concurrently presents information identifying the plurality of versions of the structured data to the user (see e.g., field 202 and the version history displayed therein). The version information that is displayed to the user may include temporal information associated with at least one of the versions of the plurality of versions of the structured data. The structured data may be a table, and the change indicator may be specific with respect to at least one of a cell, row or column of the table. Communicatively coupled to the display 1305 may be a receiver 1306 to receive the selection of the change indicator and, responsive to the receiving of the selection of the change indicator, displaying change information pertaining to the change between the first version of the current version of structured data. In some example embodiments, the receiver 1306 includes the selection of the change indicator includes detecting a master of operation with respect to a tooltip function associated with the change indicator. Some example embodiments may include, the change information that includes at least one of user, time, date or type information pertaining to the change between the first version and the current version of structured data. The identification of the change between the first version and the current version of the structured data may be performed dynamically responsive to the receipt of the identification of the first version. The identification of the change between the first version and that the current version of the structured data may be performed using stored changed data reflecting changes between the first version and the current version. Communicatively coupled to the receiver 1306 is a highlighting engine 1307 that highlights changes made to the structured data subsequent to a previous session. A previous session may be a user session during which edits were made to structured data. Highlighting may take the form of bolding, italicizing, applying a transparent color to, or some other suitable way to shown that a change has been made to the structured data.

Figure 14:
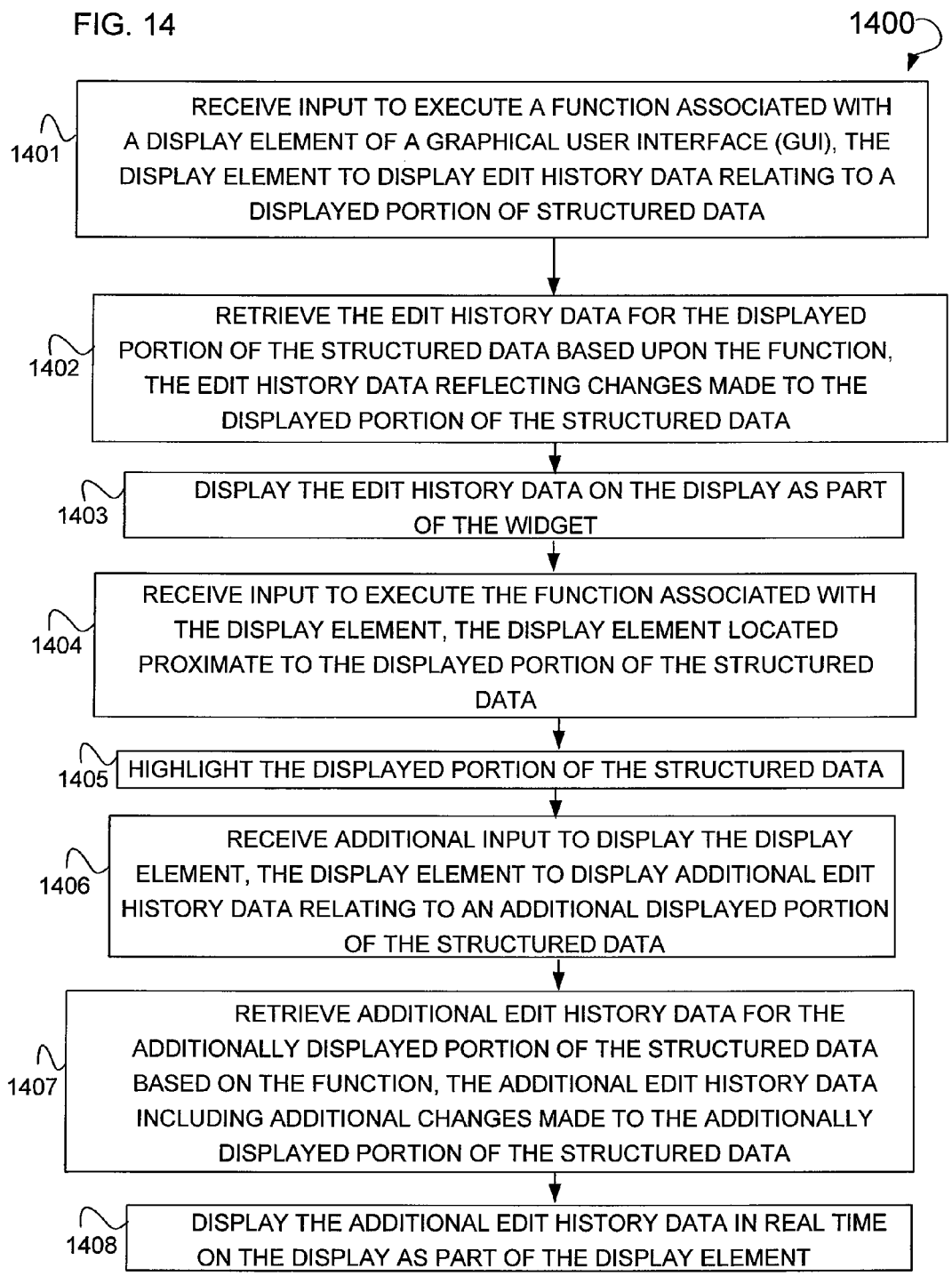
FIG. 14 is a flow chart illustrating a method, according to an example embodiment, used to display edit history data.

FIG. 14 is a flow chart illustrating a method 1400 used to display edit history data for structured data retrieved from a structured data resource. Illustrated are various operations 1401 through 1408 that may be executed by the one or more devices 102 or database server 110 that includes a GUI and a display and input device. Shown is an operation 1401 that, when executed, receives input to execute a function associated with a display element of a GUI, the display element to display edit history data relating to a displayed portion of structured data. An operation 1402 is executed to retrieve the edit history data for the displayed portion of the structured data based upon the function, the edit history data reflecting changes made to the displayed portion of the structured data. Further, an operation 1403 is executed to display the edit history data in the GUI as part of the display element. In some example embodiments, the display element includes at least one of a graphical pointer, a tooltip, or a drop-down menu. Additionally, in some example embodiments, the function associated with the display element includes a mouse-over function, a focus function, right-click function, left-click function, or a keyboard function. Operation 1404 is executed to receive input to execute the function associated with the display element, the display element located proximate to the displayed portion of the structured data. Some example embodiments may include changes that include at least one of editing record data, deletion of a column, deletion of a row, a change to a data style, adding a row, adding a column, changing a data type, changing a relationship between tables in a schema, changing a function used to process data included in a database table, creating a new table, or changing privileges associated with editing the structured data. In some example embodiments, the displayed portion of the structured data includes at least one of a database table, a structured data column, a structured data row, or a structured data schema. Operation 1405 is executed to highlight the displayed portion of the structured data. In some example embodiments, the edit history data includes identity information that identifies at least one of a user, date information, or time information. An operation 1406 is executed to receive additional input to display the display element, the display element to display additional edit history data relating to an additional displayed portion of the structured data. Operation 1407 is executed to retrieve additional edit history data for the additionally displayed portion of the structured data based on the function, the additional edit history data including additional changes made to the additionally displayed portion of the structured data. Operation 1408 is executed to display the additional edit history data in real time on the display as part of the display element.

Figure 15:
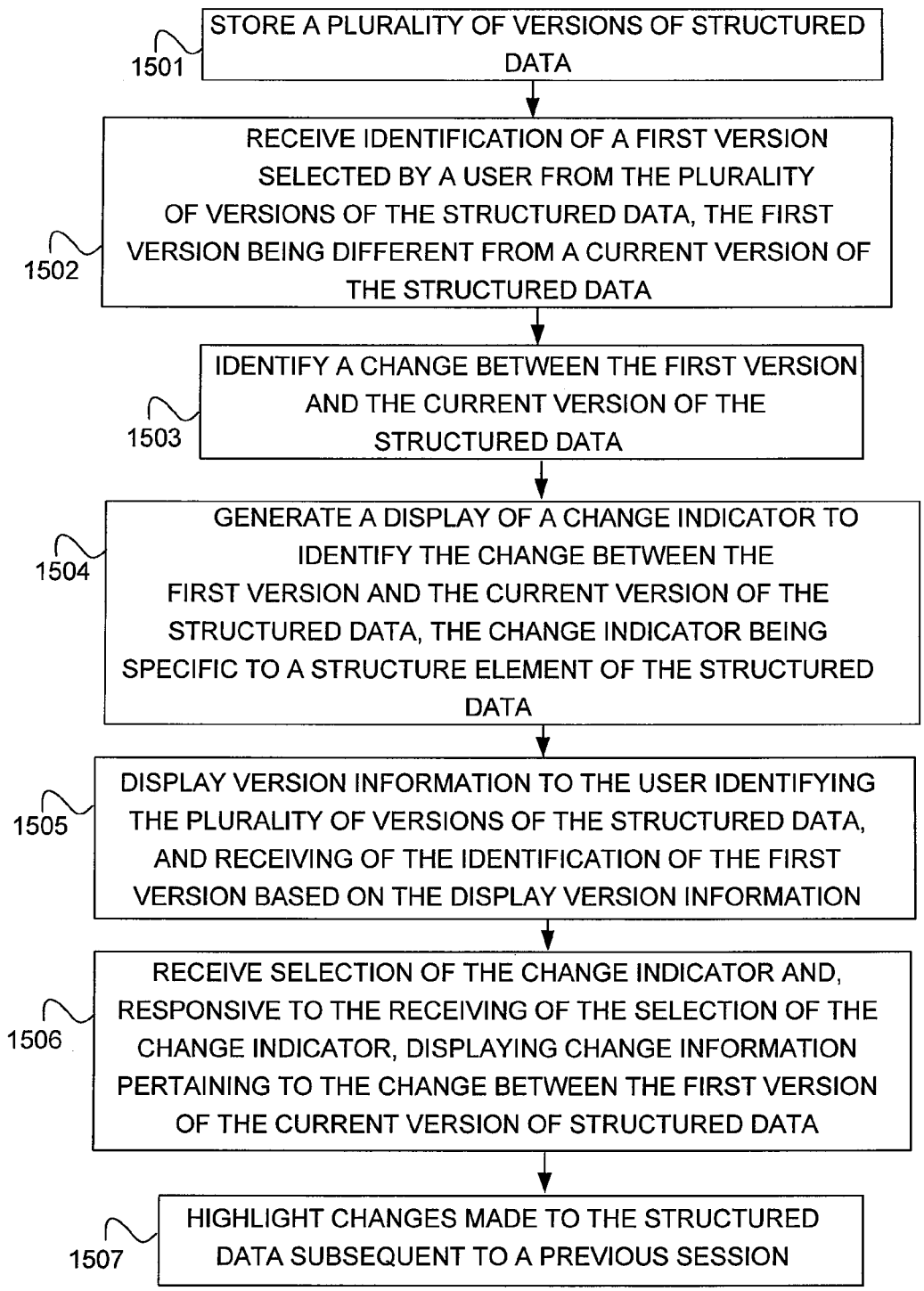
FIG. 15 is a flow chart illustrating a method, according to an example embodiment, used to display version data.

FIG. 15 is a flow chart illustrating a method 1500 used to display edit history data for structured data retrieved from a structured data resource. Illustrated are various operations 1501 through 1508 that may be executed by the one or more devices 102 or database server 110. Shown is an operation 1501 that, when executed, stores a plurality of versions of structured data. An operation 1502 is executed to receive an identification of a first version selected by a user from the plurality of versions of the structured data, the first version being different from a current version of the structured data. An operation 1503 is shown that, when executed, identifies a change between the first version and the current version of the structured data. Operation 1504 is shown that, when executed, generates a display of a change indicator to identify the change between the first version and the current version of the structured data, the change indicator being specific to a structure element of the structured data. Operation 1505 is shown that, when executed, displays version information to the user identifying the plurality of versions of the structured data, and receiving of the identification of the first version based on the display version information. In some example embodiments, the version information concurrently presents information identifying the plurality of versions of the structured data to the user. Some example embodiments may include, the version information that is displayed to the user as including temporal information associated with at least one of the versions of the plurality of versions of the structured data. Further, the structured data may be a table, and the change indicator is specific with respect to at least one of a cell, row or column of the table.

In some example embodiments, the method 1500 includes an operation 1506 that is executed to receive selection of the change indicator and, responsive to the receiving of the selection of the change indicator, displaying change information pertaining to the change between the first version of the current version of structured data. In some example embodiments, the receiving of the selection of the change indicator includes detecting a master of operation with respect to a tooltip function associated with the change indicator. Moreover, the change information may include at least one of user, time, date or type information pertaining to the change between the first version and the current version of structured data. Further, the identification of the change between the first version and the current version of the structured data may be performed dynamically responsive to the receipt of the identification of the first version. In some example embodiments, the identification of the change between the first version and that the current version of the structured data is performed using stored changed data reflecting changes between the first version and the current version. An operation 1507 may be executed to highlighting changes made to the structured data subsequent to a previous session. A previous session may be a user session during which changes were made to structured data. These changes may be stored into the log file as referenced herein. Highlighting may take the form of bolding, italicizing, applying a transparent color to, or some other suitable way to shown that a change has been made to the structured data.

Figure 16:
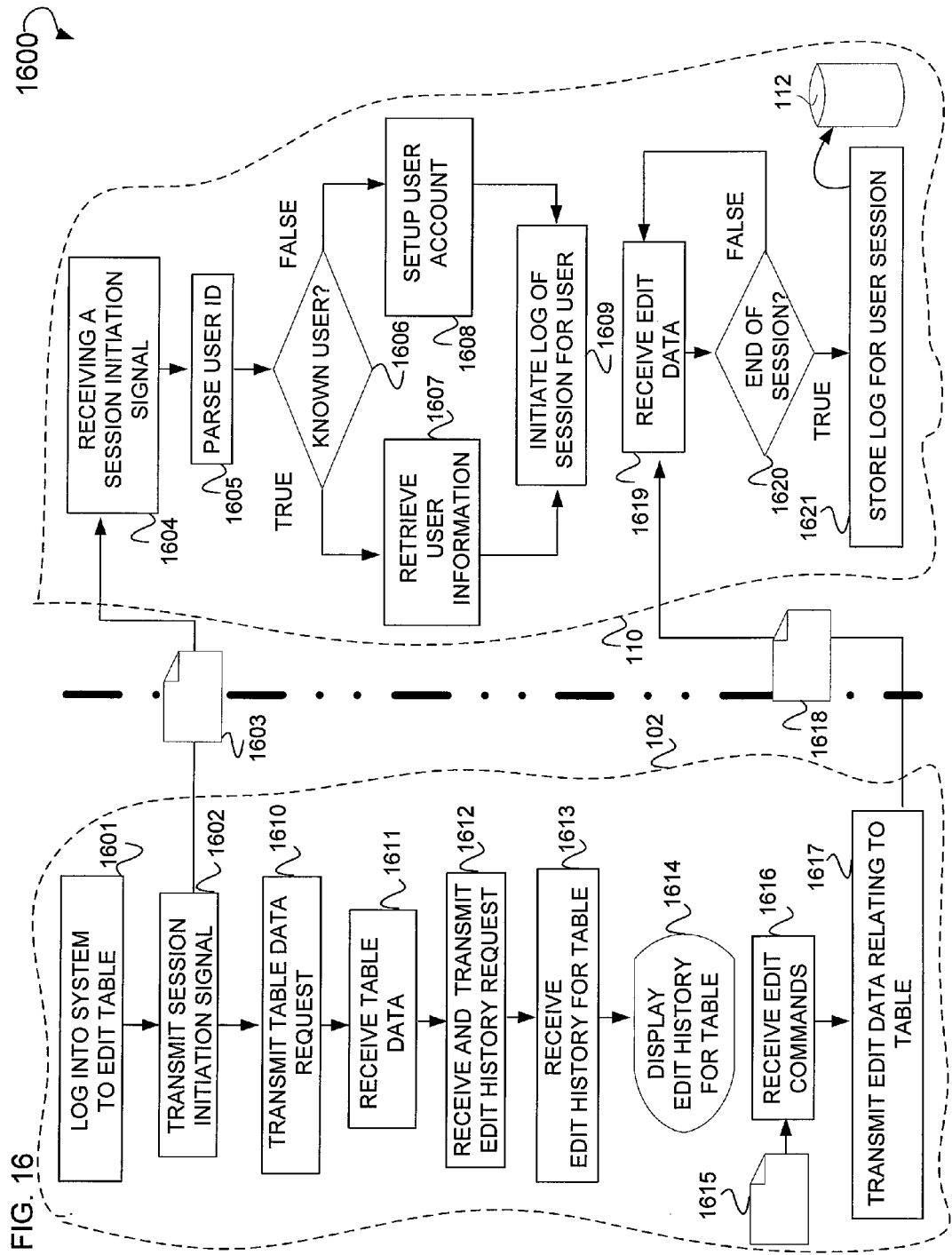
FIG. 16 is a dual-stream flow chart illustrating a method, according to an example embodiment, used to generate edit data and log data.

FIG. 16 is a dual-stream flow chart illustrating an example method 1600 used to generate edit data and log data. Shown are various operations 1601 through 1602, and 1610 through 1617 that may be executed by the one or more devices 102. Also shown are operations 1604 through 1609, and 1619 through 1621 that may be executed by the database server 110. Illustrated is an operation 1601 that, when executed, may allow the user 101 to log into a system to edit a table. This system may be the system illustrated in FIG. 1. This operation 1601 may include the user 101 providing password and user ID information. An operation 1602 may be executed that may transmit a session initiation signal, in the form of session initiation signal 1603, to the database server 110. The session initiation signal 1603 may include the login and user ID information and may be transmitted using for example HTTPS or HTTP.

In some example embodiments, an operation 1604 is shown that, when executed, receives the session initiation signal 1603. An operation 1605 may be executed that may parse user ID information from the session initiation signal 1603. A decisional operation 1606 is executed that determines whether or not the user is known and the user ID is valid. In cases where decisional operation 1606 evaluates to "false," an operation 1608 is executed that prompts the user 101, for example, to set up an account. This account set-up process may include the user 101 being presented with a web page requesting personal information relating to user 101, the name of the user 101, the e-mail address of the user 101, the physical address of the user 101, and other information associated with the user 101. In cases where decisional operation 1606 evaluates to "true," an operation 1607 is executed. An operation 1607 may retrieve user information from some type of user information database (not shown). This user information may include some type of unique identifier value associated with a user. This unique identifier information may be the user ID or some other similar ID to uniquely identify the user 101. An operation 1609 is executed that may create a log file (e.g., a log) for a session for the user 101 (e.g., a user session). A log file may be a text file that includes edits made by the user 101 during a session. As previously illustrated, the session may be for example a TCP/IP session, a session based on some pre-determined time period, or a session based upon user activity.

In some example embodiments, an operation 1610 is executed that transmits a table data request. This table data request may be the table request 108 and may be transmitted using HTTP or HTTPS. Included within this table data request may be a request for a particular table or schema. An operation 1611 is executed may receives table data such as table data 113. An operation 1612 is executed that receives and transmits an edit history request, wherein the edit history is requested from the database server 110 regarding a particular table schema or data included within a table. An operation 1613 is executed that receives an edit history for a table. This edit history may be retrieved through the execution of operation 1613 in real time such that when an edit is made by one user, this edit is reflected in the edit history as viewed by a second user. These edits may be reflected in a periodic basis (e.g., based upon some predetermined passage of time), or on the basis of some edit being received by the database server 110. As outlined above, AJAX, HTTP and TCP/IP may be used to facilitate this real time editing. For example, a TCP/IP connection may exist between the database server 110 and a plurality of devices (e.g., the one or more devices 102). Using this TCP/IP connection real time updating may occur. An operation 1614 is executed that displays this edit history for a table. As previously illustrated, this edit history may be displayed via a mouse pointer and tooltip 301, 402, 501, a mouse pointer and drop-down menu 601, or mouse pointer and tooltip 702, 902, 1005, or 1101. An operation 1616 is executed that receives edit commands. These edit commands may be in the form of edit commands 1615. These edit commands may include the aforementioned changes, and date and time data associated with theses changes (see e.g., the previously illustrated identifying data). These edit commands may be generated as part of a collaborative endeavor between the user 101 and another user. An operation 1617 is executed that transmits edit data relating to the table. This edit data may be edit data 1618. This edit data may be transmitted using for example HTTP or HTTPS. An operation 1619 is executed that receives edit data. Further, a decisional operation 1620 is executed that determines whether or not a session has ended. In cases where decisional operation 1620 evaluates to "false," an operation 1619 is re-executed to receive additional edit data. In cases where decisional operation 1620 evaluates to "true," an operation 1621 is executed that stores a log file for a user session into the user history edit database 112. This log file may be later referenced for the purposes of displaying an edit history for a particular table and or schema.

Figure 17:
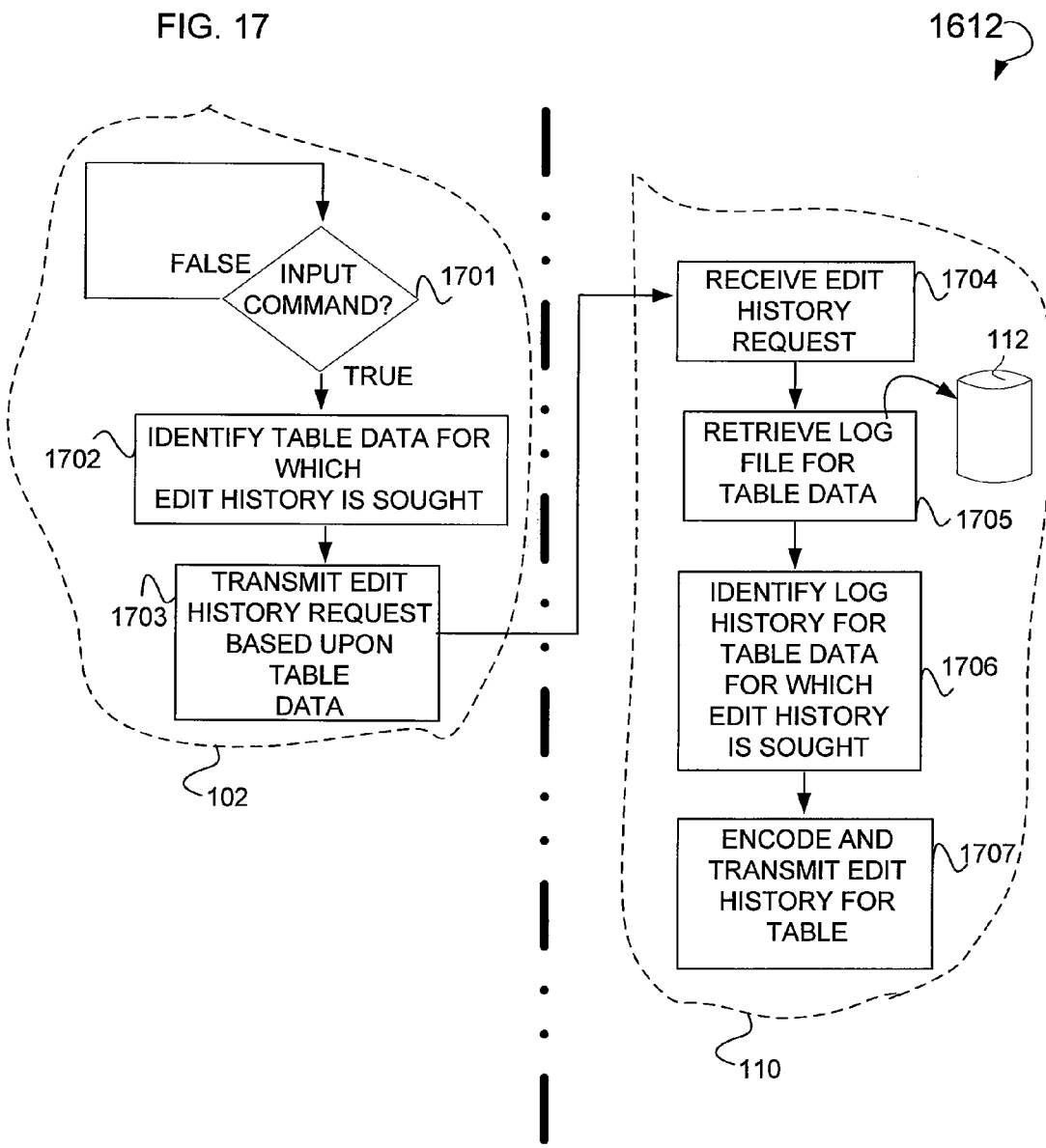
FIG. 17 is a dual-stream flow chart illustrating the execution of an operation, according to an example embodiment, that, when executed, may receive and transmit an edit history request.

FIG. 17 is a dual-stream flow chart illustrating the execution of operation 1612. Shown are operations 1701 through 1703 that may reside on and be executed by the one or more devices 102. Also shown are operations 1704 through 1707 that may be executed by the database server 110. Illustrated is a decisional operation 1701 that determines whether or not the input command has been received. An input command may be a command to execute a function associated with the mouse pointer and/or screen object or widget. In cases where decisional operations 1701 evaluates to "false," operation 1701 is re-executed. In cases where decisional operation 1701 evaluates to "true," an operation 1702 is executed. The operation 1702 may identify table data for which an edit history is sought. Table data may include a portion or a database table or scheme. This identification may be based on the association between an input command and the portion of the database table or schema. For example, the edit history displayed through the use of mouse pointer and tooltip 301 and 402 may be displayed as a result of the proximity between the mouse pointer and tooltip 301 and the table row 201, or the proximity of the mouse pointer and tooltip 402 and the table row 401.

In some example embodiments, an operation 1703 is executed that transmits an edit history request to the database server 110. This edit history request may be transmitted using HTTP or HTTPS and may include the particular portion of a table or schema for which an edit history is sought. This edit history may be identified via some type of unique key value or uniquely identifying value. A unique key value may be, for example, an integer value that is associated with the table displayed within the GUI 107 that may be used to uniquely identify a tuple, or row, in a table. An operation 1704 may be executed and may receive an edit history request. An operation 1705 is executed and may retrieve a log file for table data from the user edit history database 112. An operation 1706 is executed that identifies a log history for the table data for which an edit history is sought. This identification may involve for example taking the unique key value associated with a row or tuple of a table displayed within the table display and editing GUI 107 and using that key value to retrieve the log file associated with the table data. An operation 1707 is executed that encodes and transmit the edit history. This encoding and transmission may involve the utilization of HTTP, HTTPS or some other suitable protocol.

Figure 18:
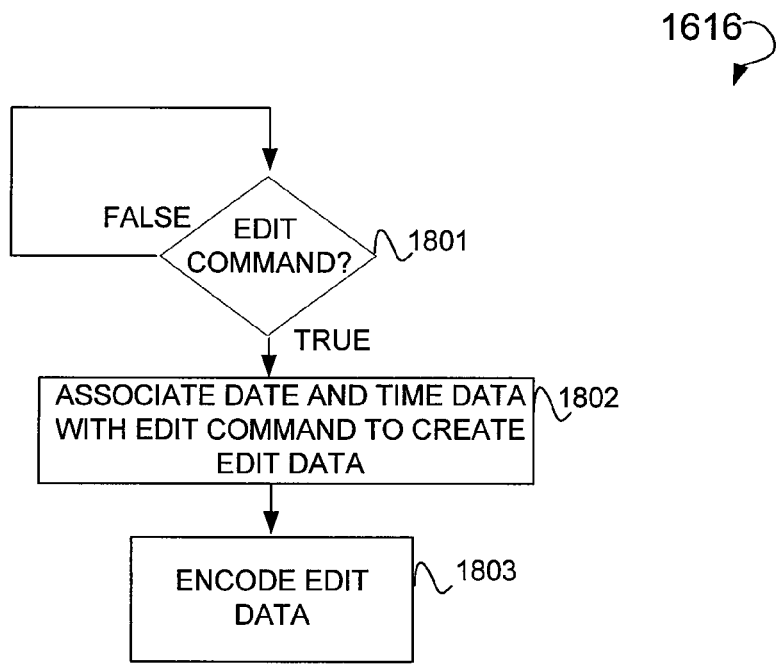
FIG. 18 is a flow chart illustrating the execution of operation, according to an example embodiment, that, when executed, may receive edit commands.

FIG. 18 is a flow chart illustrating the execution of operation 1816. Shown is a decisional operation 1801 that determines whether or not an edit command has been received. An edit command may include a deletion, addition, modification, or some other change as previously illustrated. In cases where decision operations 1801 evaluates to "false," decision operation 1801 is re-executed. In cases where decision operations 1801 evaluates to "true," an operation 1802 is executed. An operation 1802 is executed to associate a date and time data with the edit command to create edit data. An operation 1803 is executed that encodes the edit data.

Figure 19:
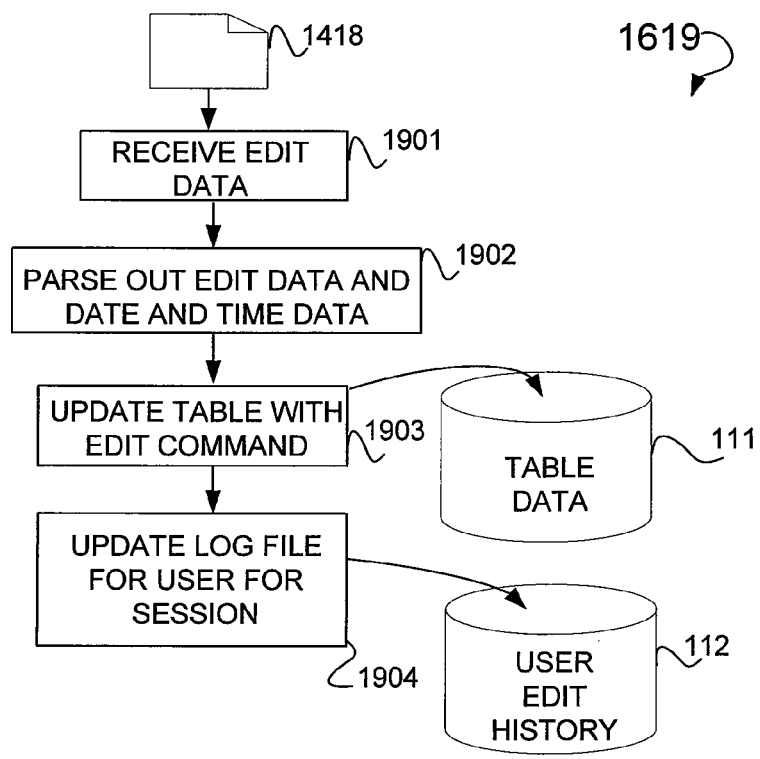
FIG. 19 is a flow chart illustrating the execution of operation, according to an example embodiment, that, when executed, may receive edit data.

FIG. 19 is a flow chart illustrating the execution of operation 1619. Shown is edit data 1418 that is received through the execution of operation 1901. Operation 1901, when executed, may receive edit data. An operation 1902 is executed that parses out edit data and time and date data. An operation 1903 is executed that updates a table data database 111 with the edit command associated with the edit data. An operation 1904 is executed that updates a log file for a user for a particular session that a user is involved with. This updating of the log file may include for example updating a user edit history database 112.

Example Database

Some embodiments may include the various databases (e.g., 111 or 112) being relational databases, flat files, XML based databases, object databases, or, in some cases, Online Analytic Processing (OLAP) based databases. In the case of relational databases, various tables of data are created and data is inserted into and/or selected from these tables using SQL or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application (e.g., database products) such as, for example, MYSQL™, MICROSOFT SQL SERVER™, ORACLE 8I™, 10G™, or some other suitable database application may be used to manage the data. In this, the case of a database using cubes and MDX, a database using Multidimensional Online Analytic Processing (MOLAP), Relational Online Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 20:
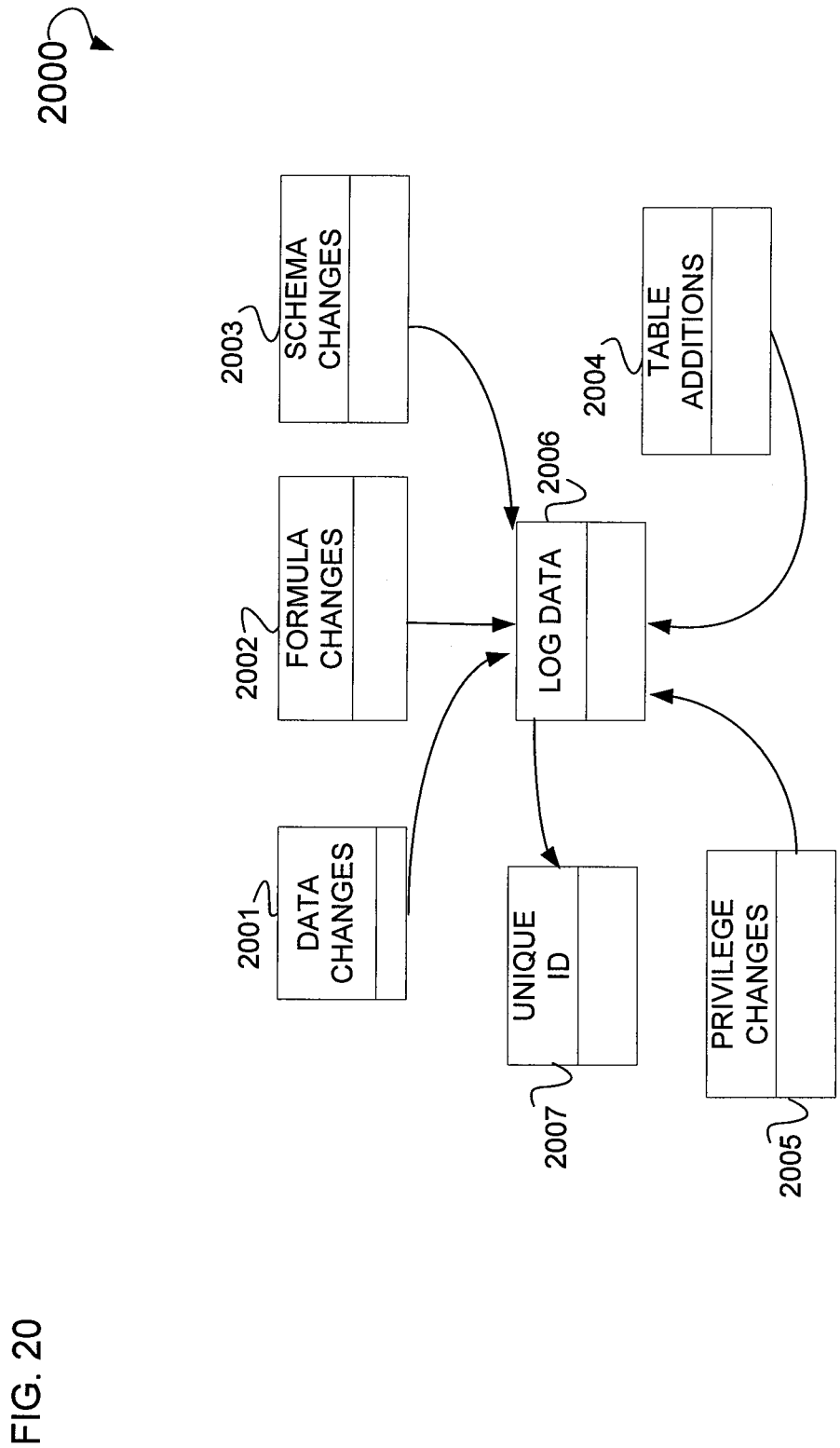
FIG. 20 is a Relational Data Schema (RDS), according to an example embodiment, illustrating various data tables that may be used within the system or method shown herein.

FIG. 20 is a Relational Data Schema (RDS) 2000 illustrating various data tables that may be used within the system or method shown herein. A table 2001 may be used that may be used to store data changes for various tables used within the data table database 111. These data changes may be stored as a string, integer, or other suitable data types. A table 2002 is also shown that may include formula changes for formulas used. The formulas changed are otherwise used within the tables stored within the table data database 111. These formulas may be stored as a string data type, XML data type, or some other suitable data type. A table 2003 is shown that may include schema changes where the schema changes may include changes of relationship between tables within a particular database schema. These changes may be stored as an integer data type and may include the changing of various foreign key, or other key values associated with tables included within the table data database 111. The table 2004 is shown that may include the table addition information wherein these table additions may include the additions of rows, columns, or even tables associated with a particular database schema that may be included within the table data database 111. These table additions may be stored as an integer, a string, or other suitable data type. A table 2005 is shown that may include data relating to privileges and changes on privileges. For example, boolean privileges may be documented using for example a boolean value, a string value, or some other suitable value. A table 2006 is shown that includes log data. This log data may include data taken from any one of the tables 2001 through 2005 associated with a date and time value and a unique identifier for a particular user. This log data may be stored as, for example, a string or some other suitable data type. For example, a string, XML, or some other suitable data type. A table 2007 is shown that may include a unique identifier values for each of the entries in the table 2006. This table 2007 may include an integer value used to uniquely identify a particular user and changes facilitated by that user. For example, this unique ID may be a user ID value or other suitable ID value.

Component Design

Some example embodiments may include the above-illustrated operations being written as one or more software components. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. These components are linked to other components via various Application Programming Interfaces (APIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A System of Transmission between a Server and Client

Some embodiments may use the Open Systems Interconnection (OSI) model or Transmission Control Protocol/Internet Protocol (TCP/IP) protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as the Internet, a LAN, a WAN, or some other suitable network. In some cases, Internet refers to a network of networks. These networks may use a variety of protocols for the exchange of data, including the aforementioned TCP/IP, or some other suitable protocol. These networks may be organized within a variety of topologies (e.g., a star topology) or structures.

A Computer System

Figure 21:
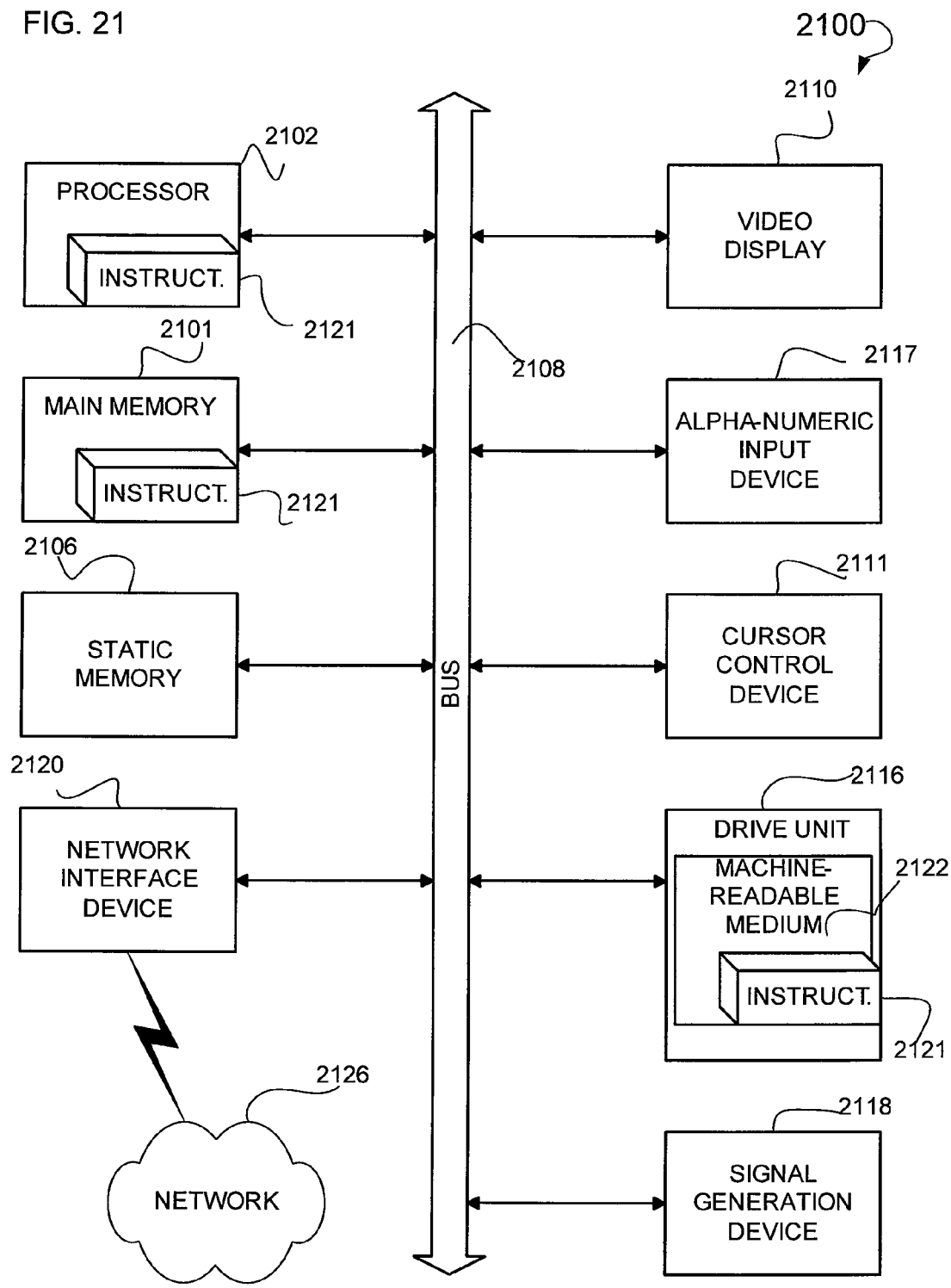
FIG. 21 shows a diagrammatic representation of a machine in the example form of a computer system that executes a set of instructions to perform any one or more of the methodologies discussed herein.

FIG. 21 shows a diagrammatic representation of a machine in the example form of a computer system 2100 that executes a set of instructions to perform any one or more of the methodologies discussed herein. A server is a computer system. In alternative embodiments, the machine operates as a stand-alone device or may be connected (e.g., networked) to other machines. This system and method illustrated here may be organized in a client-server or networked deployment or as a stand-alone arrangement. This stand-alone arrangement may allow the system and method illustrated here to be executed on a single computer system. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2100 includes a processor 2102 (e.g., a CPU, a Graphics Processing Unit (GPU) or both), a main memory 2101, and a static memory 2106, which communicate with each other via a bus 2108. The computer system 2100 may further include a video display unit 2110 (e.g., a Liquid Crystal Display (LCD) or a Cathode Ray Tube (CRT)). The computer system 2100 also includes an alpha-numeric input device 2117 (e.g., a keyboard), a UI cursor controller 2111 (e.g., a mouse), a drive unit 2116, a signal generation device 2118 (e.g., a speaker) and a network interface device (e.g., a transmitter) 2120.

The disk drive unit 2116 includes a machine-readable medium 2122 on which is stored one or more sets of instructions and data structures (e.g., software) 2121 embodying or used by any one or more of the methodologies or functions illustrated herein. The software instructions 2121 may also reside, completely or at least partially, within the main memory 2101 and/or within the processor 2102 during execution thereof by the computer system 2100, the main memory 2101 and the processor 2102 also constituting machine-readable media.

The instructions 2121 may further be transmitted or received over a network 2126 via the network interface device 2120 using any one of a number of well-known transfer protocols (e.g., HTTP, HTTPS).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

Marketplace Applications

In some example embodiments, a system and method is shown that includes the tracking of changes made to a table that is part of a database. These changes may exist in the form of edit data generated by one or more users acting collaboratively. This edit data may be saved during a session that the one or more users may participate within. The save edit data may then be accessible as a log file and provided for display as an edit history. Associated with this edit history may be information identifying the user who made the edits to the table or schema, the date of these edits, and the sequence of these edits.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
 displaying an indicator relating to a displayed portion of structured data in response to a graphical pointer being near the portion of structured data, the indicator indicating that the portion of structured data is associated with edit history data;

receiving input to execute a function associated with a display element of a Graphical User Interface (GUI), the display element being a drop-down menu to display the edit history data relating to the portion of structured data;

in response to receiving the input:

accessing an edit history database at a server including accessing the edit history database over a network using a networking protocol, the edit history database tracking changes to content of the structured data as the changes are made by a plurality of users including tracking a particular change from a first version of the content of the structured data to a second version of the content of the structured data, the particular change being accessible to the plurality of users;

retrieving, from the edit history database, the edit history data for the displayed portion of the structured data based upon the function, the edit history data reflecting changes to the displayed portion of the structured data made by the plurality of users; and displaying the edit history data in the GUI as part of the display element.

2. The computer implemented method of claim 1, wherein the function associated with the display element includes a mouse-over function, a focus function, right-click function, left-click function, or a keyboard function.

3. The computer implemented method of claim 1, further comprising receiving input to execute the function associated with the display element, the display element located proximate to the displayed portion of the structured data.

4. The computer implemented method of claim 1, wherein the changes include at least one of a deletion of editing record data, deletion of a column, deletion of a row, a change to a data style, adding a row, adding a column, changing a data type, changing a relationship between tables in a schema, changing a function used to process data included in a database table, creating a new table, or changing privileges associated with editing the structured data.

5. The computer implemented method of claim 1, wherein the displayed portion of the structured data includes at least one of a database table, a structured data column, a structured data row, or a structured data schema.

6. The computer implemented method of claim 1, further comprising highlighting the displayed portion of the structured data.

7. The computer implemented method of claim 1, wherein the edit history data includes identity information that identifies at least one of a user, date information, or time information.

8. The computer implemented method of claim 1, further comprising:

receiving additional input to display the display element, the display element to display additional edit history data relating to an additional displayed portion of the structured data;

retrieving additional edit history data for the additionally displayed portion of the structured data based on the function, the additional edit history data including additional changes made to the additionally displayed portion of the structured data; and displaying the additional edit history data in real time on the display as part of the display element.

9. The computer implemented method of claim 1, further comprising highlighting changes made to the structured data subsequent to a previous session.

10. A computer implemented method comprising:

storing, in a database, a plurality of versions of structured data, the database tracking changes to content of the structured data as the changes are made by a plurality of users including tracking a change from a first version of the content of the structured data to a current version of the content of the structured data, the particular change being accessible to the plurality of users;

receiving identification of the first version selected by a user from the plurality of versions of the structured data, the first version being different from the current version of the structured data;

identifying the change between the first version and the current version of the structured data; and generating a display of a change indicator to identify the change between the first version and the current version of the structured data including generating the display in response to a graphical pointer being near the current version of the content of the structured data, the change indicator being specific to a structure element of the structured data and being displayed in a drop-down menu relating to the structure element.

11. The method of claim 10, further comprising displaying version information to the user identifying the plurality of versions of the structured data, and receiving of the identification of the first version based on the display version information.

12. The method of claim 11, wherein the version information concurrently presents information identifying the plurality of versions of the structured data to the user.

13. The method of claim 11, wherein the version information that is displayed to the user includes temporal information associated with at least one of the versions of the plurality of versions of the structured data.

14. The method of claim 10, wherein the structured data is a table, and the change indicator is specific with respect to at least one of a cell, row or column of the table.

15. The method of claim 10, further comprising receiving selection of the change indicator and, responsive to the receiving of the selection of the change indicator, displaying change information pertaining to the change between the first version of the current version of structured data.

16. The method of claim 15, wherein the receiving of the selection of the change indicator includes detecting a master of operation with respect to a tooltip function associated with the change indicator.

17. The method of claim 15, wherein the change information includes at least one of user, time, date or type information pertaining to the change between the first version and the current version of structured data.

18. The method of claim 10, wherein the identification of the change between the first version and the current version of the structured data is performed dynamically responsive to the receipt of the identification of the first version.

19. The method of claim 10, wherein the identification of the change between the first version and that the current version of the structured data is performed using stored changed data reflecting changes between the first version and the current version.

20. A computer system comprising:

a display to display an indicator relating to a displayed portion of structured data in response to a graphical pointer being near the portion of structured data, the indicator indicating that the portion of structured data is associated with edit history data;

a receiver to receive input to execute a function associated with a display element of a Graphical User interface (GUI), the display element being a drop-down menu to display the edit history data relating to the portion of structured data; and a retriever to, in response to receiving the input:
- access an edit history database at a server including accessing the edit history database over a network using a networking protocol, the edit history database tracking changes to content of the structured data as the changes are made by a plurality of users including tracking a particular change from a first version of the content of the structured data to a second version of the content of the structured data, the particular change being accessible to the plurality of users, and
- retrieve, using at least one processor coupled to a memory, from the edit history database, the edit history data for the displayed portion of the structured data based upon the function, the edit history data reflecting changes to the displayed portion of the structured data made by the plurality of users;

wherein the display is further configured to display the edit history data in the GUI as part of the display element.

21. The computer system of claim 20, wherein the function associated with the display element includes a mouse-over function, a focus function, right-click function, left-click function, or a keyboard function.

22. The computer system of claim 20, further comprising an additional receiver to receive input to execute the function associated with the display element, the display element located proximate to the displayed portion of the structured data.

23. The computer system of claim 20, wherein the changes include at least one of a deletion of editing record data, deletion of a column, deletion of a row, a change to a data style, adding a row, adding a column, changing a data type, changing a relationship between tables in a schema, changing a function used to process data included in a database table, creating a new table, or changing privileges associated with editing the structured data.

24. The computer system of claim 20, wherein the displayed portion of the structured data includes at least one of a database table, a structured data column, a structured data row, or a structured data schema.

25. The computer system of claim 20, further comprising a highlighting engine to highlight the displayed portion of the structured data.

26. The computer system of claim 20, wherein the edit history data includes identity information that identifies at least one of a user, date information, or time information.

27. The computer system of claim 20, further comprising:
- an additional receiver to receive additional input to display the display element, the display element to display additional edit history data relating to an additional displayed portion of the structured data;
- an additional retriever to retrieve additional edit history data for the additionally displayed portion of the structured data based on the function, the additional edit history data including additional changes made to the additionally displayed portion of the structured data; and
- an additional display to display the additional edit history data in real time on the display as part of the display element.

28. The computer system of claim 20, further comprising a highlighting engine to highlight changes made to the structured data subsequent to a previous session.

29. An apparatus comprising:
- means for displaying an indicator relating to a displayed portion of structured data in response to a graphical pointer being near the portion of structured data, the indicator indicating that the portion of structured data is associated with edit history data;
- means for receiving input to execute a function associated with a display element of a Graphical User interface (GUI), the display element being a drop-down menu to display the edit history data relating to the portion of structured data;
- means for accessing an edit history database at a server including accessing the edit history database over a network using a networking protocol, the edit history database tracking changes to content of the structured data as the changes are made by a plurality of users including tracking a particular change from a first version of the content of the structured data to a second version of the content of the structured data, the particular change being accessible to the plurality of users;
- means for retrieving, using at least one processor coupled to a memory, from the edit history database, the edit history data for the displayed portion of the structured data based upon the function, the edit history data reflecting changes to the displayed portion of the structured data made by the plurality of users; and
- means for displaying the edit history data in the GUI as part of the display element.

30. A machine-readable non-transitory storage medium comprising instructions, which when implemented by one or more machines, cause the one or more machines to perform the following operations:
- displaying an indicator relating to a displayed portion of structured data in response to a graphical pointer being near the portion of structured data, the indicator indicating that the portion of structured data is associated with edit history data;
- receive input to execute a function associated with a display element of a Graphical User Interface (GUI), the display element being a drop-down menu to display the edit history data relating to the portion of structured data;
- access an edit history database at a server including accessing the edit history database over a network using a networking protocol, the edit history database tracking changes to content of the structured data as the changes are made by a plurality of users including tracking a particular change from a first version of the content of the structured data to a second version of the content of the structured data, the particular change being accessible to the plurality of users;
- retrieve, from the edit history database, the edit history data for the displayed portion of the structured data based upon the function, the edit history data reflecting changes to the displayed portion of the structured data made by the plurality of users; and
- display the edit history data in the GUI as part of the display element.

* * * * *